(12) United States Patent  
Satzke

(10) Patent No.: US 7,774,475 B2  
(45) Date of Patent: Aug. 10, 2010

(54) METHOD FOR OPERATING A SYMMETRIC NETWORK ADDRESS TRANSLATION

(75) Inventor: Klaus Satzke, Tamm (DE)

(73) Assignee: Alcatel, Paris (FR)

( * ) Notice: Subject to any disclaimer, the term of this patent is extended or adjusted under 35 U.S.C. 154(b) by 1112 days.

(21) Appl. No.: 10/994,351

(22) Filed: Nov. 23, 2004

(65) Prior Publication Data

US 2005/0165963 A1 Jul. 28, 2005

(30) Foreign Application Priority Data

Dec. 23, 2003 (EP) ................................. 03293320

(51) Int. Cl.
*G06F 15/16* (2006.01)
(52) U.S. Cl. ................................................ 709/227
(58) Field of Classification Search ............... 709/227
See application file for complete search history.

(56) References Cited

U.S. PATENT DOCUMENTS

| | | | | |
|---|---|---|---|---|
| 7,043,564 | B1 * | 5/2006 | Cook et al. | 709/246 |
| 7,072,981 | B1 * | 7/2006 | O'Rourke et al. | 709/245 |
| 7,143,188 | B2 * | 11/2006 | Maufer et al. | 709/245 |
| 7,315,541 | B1 * | 1/2008 | Housel et al. | 370/392 |
| 7,391,768 | B1 * | 6/2008 | Samprathi et al. | 370/389 |
| 2002/0116502 | A1 * | 8/2002 | Iyer et al. | 709/227 |
| 2003/0043740 | A1 | 3/2003 | March et al. | |
| 2003/0065817 | A1 | 4/2003 | Benchetrit et al. | |
| 2003/0154306 | A1 | 8/2003 | Perry | |
| 2004/0139228 | A1 * | 7/2004 | Takeda et al. | 709/245 |
| 2006/0168328 | A1 * | 7/2006 | Shimada et al. | 709/238 |

OTHER PUBLICATIONS

Rattananon S et al: "Extending REBEKAH-IP with central port allocations for un-ambiguous IPv4 address expansion" Sep. 28, 2003, pp. 211-216, XP010683527.

* cited by examiner

*Primary Examiner*—Hassan Phillips
*Assistant Examiner*—Alan S Chou
(74) *Attorney, Agent, or Firm*—Sughrue Mion, PLLC

(57) ABSTRACT

The invention relates to a method for operating a symmetric network address translation NAT (100) setting up sessions between a user terminal (110-1, 110-2) and a server (120-1, 120-2). If a new session is initiated by said user terminal an external IP-address (C) and port (D) representing the desired destination server as well as a public NAT-IP address (X) are determined. Further, a public NAT-IP port is selected. Finally, the NAT sets up the new session based on an appropriate entry representing said new session in a NAT table. In order to save available public NAT-IP ports a new session according to the invention not necessarily represented by a new public NAT-IP port, but by a tuple comprising the public NAT-IP address, the selected public NAT-IP port (Y), the external IP address (C) and the port (D). A new session is set up only if there is an entry of the whole tuple identifying said new session in said NAT-table.

10 Claims, 2 Drawing Sheets

METHOD FOR OPERATING A SYMMETRIC NETWORK ADDRESS TRANSLATION

TECHNICAL FIELD

The invention relates to a method for operating a symmetric network address translation NAT setting up sessions between a user terminal and a server. The invention further relates to a computer program and a NAT for carrying out said method as well as to a data storage means for storing said computer program.

The invention is based on a priority application, EP 03293320.2, which is hereby incorporated by reference.

BACKGROUND OF THE INVENTION

NATs and their operation are in principle known in the art. In principle NATs serve for establishing a session between a user terminal of a private network and a server of a public network, in particular the internet. The establishment is done by allocating a private address and port of the NAT, representing the user terminal to an external address and port representing said server. If a new session between a user terminal and a server is initiated in particular by said user terminal the NAT determines said external IP address and port as well as its own public IP address. Further, for each new session the symmetric NATs in the prior art select a new public NAT-IP port and check if there is an entry of said newly selected public NAT-IP port in a first NAT-table.

Said first NAT-table represents sessions currently allowed to run via said NAT. In the case that there is such an entry of a newly selected public NAT port already included in said NAT-table in the prior art the NATs select another public NAT-IP port for said new session and checks if said other public NAT-IP port is part of an entry of said first NAT-table. These steps of selecting another public NAT-IP port and checking said other NAT-IP port with the entries of said first NAT-table is repeated as long as a public NAT-IP port has been selected which is not already part of an entry in said first NAT-table. In that case a new entry comprising the finally selected public NAT-IP port is input into said first NAT-table. Based on said new entry the NAT is embodied to set up the desired new session between the user terminal and the server of the public network.

As mentioned in the previous paragraph, in the prior art each new session is represented by a new public NAT-IP port. Typically, a public NAT-IP port is identified by a 16 bit word. Consequently, in the prior art the number of sessions which can be distinguished and handled simultaneously by the NAT is limited to a number of $2^{16}$ sessions. Expressed in other words, the NAT is not able to handle more than $2^{16}$ sessions simultaneously with the result that each session going beyond that number is not set up by the NAT.

Starting from that prior art it is the object of the invention to improve a known method to operate a NAT as well as a known computer program or a known NAT for carrying out said method such that the session capacity, i.e. the number of sessions which can be distinguished or handled simultaneously by the NAT is increased without the number of bits representing an address and port of the user terminal, the NAT or the external server being increased either.

SUMMARY OF THE INVENTION

This object is solved by a method for operating a symmetric Network Address Translation NAT setting up sessions between a user terminal and a server, comprising the steps of:

determining an external IP address and port representing said server as well as a public NAT-IP address if a new session is initiated by said user terminal or said server;

selecting a public NAT-IP port for said new session; and setting up the new session betweeen said user terminal and said server via said selected public NAT-IP port based on an entry in a first NAT-table representing sessions currently allowed to run via said NAT;

wherein the new session is individually identified by a session identifier in the form of a tuple comprising the public NAT-IP address, the selected public NAT-IP port, the external IP address and port; and the setting up of the new session is based on an entry of said tuple in said first NAT-table. That method is characterized in that the new session is individually identified by a session identifier in the form of a tuple comprising the public NAT-IP address, the selected public NAT-IP port, the external IP address and port, and in that the setting-up of the new session is based on an entry of said tuple in the first NAT-table.

There are several types of NATs known in the art. However, the present invention only relates to a so-called symmetric NAT. A symmetric NAT establishes some kind of firewall in particular for incoming packets from the public side, that means from the server, by accepting such packets only if previously another packet has been sent from the user terminal to said server. Said security advantage of in particular symmetric NATs is advantageously not infringed by the present invention.

The term "user terminal" in the present invention means a terminal or a server of typically a private network on the private side of the NAT. To the contrary, the term "server" in the present invention means a server typically of a public network, in particular the internet on the public side of the NAT.

In the present invention a new session is initiated in the cases that the private NAT-IP address and the private NAT-IP port, representing the user terminal, the external address and the external port, representing the server, changes for a new packet transmission. One session may comprise a plurality of packet transmissions in both directions, i.e. from the user terminal to the server and vice-versa. Currently enabled sessions are mapped in the first NAT-table. A session is enabled only for a predetermined time interval, consequently, it is cancelled after the lapse of said time interval.

By defining the session identifier as claimed in claim 1 the session-capacity of the NAT is advantageously significantly increased. That new definition of the session identifier enables the NAT to distinguish not only 2 exp{bitwidth of the public NAT-IP port} sessions, but to distinguish a number of 2 exp{bitwidths of the public NAT-IP port+bitwidths of the external IP address+/or bitwidths of the external port} sessions.

The claimed new definition of the session identifier advantageously represents an economical allocation of the public NAT-IP address and port because now it is not strictly necessary that each new session is represented by a new public NAT-IP port. Expressed the other way round, different session identifiers representing different sessions may comprise identical public NAT-IP ports. This makes it possible that the public NAT-IP ports may be allocated or used for other purposes.

Advantageously, the NAT is enabled to set up a new session only if its session identifier defined according to the invention is unique within said first NAT table.

The above-identified object of the invention is further solved by a computer program and by a symmetric NAT for carrying said method. Moreover, it is solved by a data storage means for storing said computer program. The advantages of said solutions correspond to the advantages mentioned above by referring to the claimed method.

BRIEF DESCRIPTION OF THE DRAWINGS

There are two figures accompanying the description, wherein.

DETAILED DESCRIPTION OF THE INVENTION

In the following the invention is described in more detail by referring to said figures.

Figure 1:
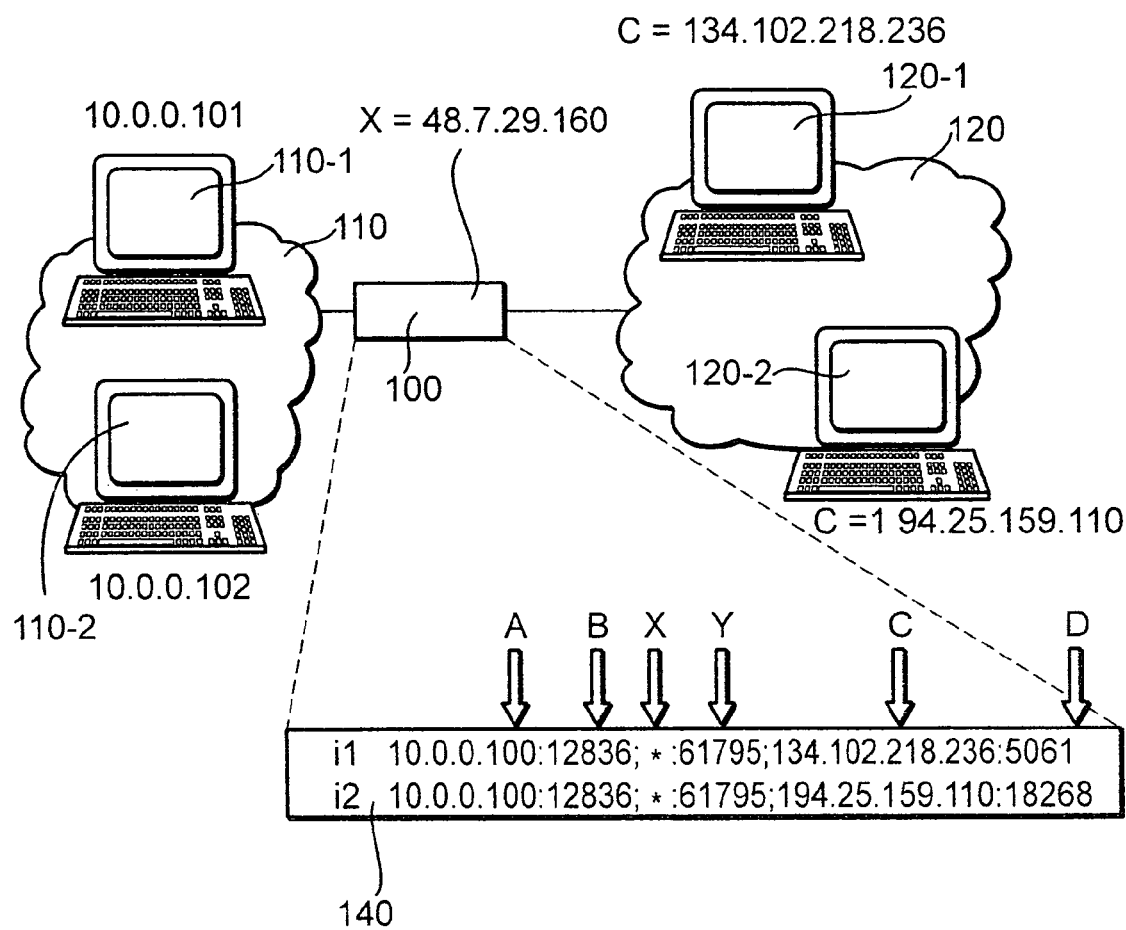
FIG. 1 shows a NAT connecting a private network with a public network.

FIG. 1 shows a symmetric network address translation NAT for setting up sessions between a user terminal 110-1 or 110-2 of a private network 110 and a server 120-1 or 120-2 of a public network 120, in particular the internet. Said NAT serves as some kind of security means because it does not allow arbitrary but only predetermined packet transmissions between said user terminals and said servers. More specifically, the transmission of packets is only allowed for sessions which are represented by an individual entry in a NAT-table 140. Each of said entries typically comprises 6 parameters A, B, X, Y, C and D. The private NAT-IP address A and the private NAT-IP port B are generated by said NAT in response to the initiation of a new session. Explained in more detail, the private NAT address A represents the user terminal 110-1, 110-2 which has initiated the respective session and the private NAT-IP port P represents said user terminal's port.

Further, each entry of said NAT-table comprises a public NAT-IP address X and a public NAT-IP port Y. Said public NAT-IP address X is co-ordinated to the NAT and constant for each entry and session of said NAT. There is a fix binding between the private NAT-IP address A and the public NAT-IP address X as well as between the private NAT-port P and the private NAT-IP port Y; these fix correlation is provided by a specific part of said NAT-table, hereinafter called second NAT-table.

Finally, each entry of said NAT-table 140 comprises the external IP address C and the external IP port D of the external server 120-1 or 120-2.

According to the invention the tuple X, Y, C, D is referred to as session identifier. In the example shown in FIG. 1 the first entry i1 represents a session between a particular port B=12836 of one of said user terminals 110-1, 110-2 the private network 110 of which being represented by the private NAT-IP address IP address A=10.0.0.100. In the example given in FIG. 1 the tuple A, B correlates to the public IP address X=48.7.29.160 of the NAT 100 and to the co-ordinated public NAT-IP port Y=61795. The above-mentioned port of the user terminal communicates with the external server port D=5061 of the server 120-1 having the external IP address C=134.102.218.236. The session identifiers X,Y,C,D of different sessions form another part of said NAT-table, hereinafter referred to as first NAT-table.

The entries within said NAT-table are deleted after a predetermined time interval. Consequently, after said time interval has lapsed, the session represented by the deleted entry is not allowed to run via said NAT 100 anymore. In that case, if required, a new session between a particular port of a user terminal and a particular port of a server has to be initiated.

Figure 2:
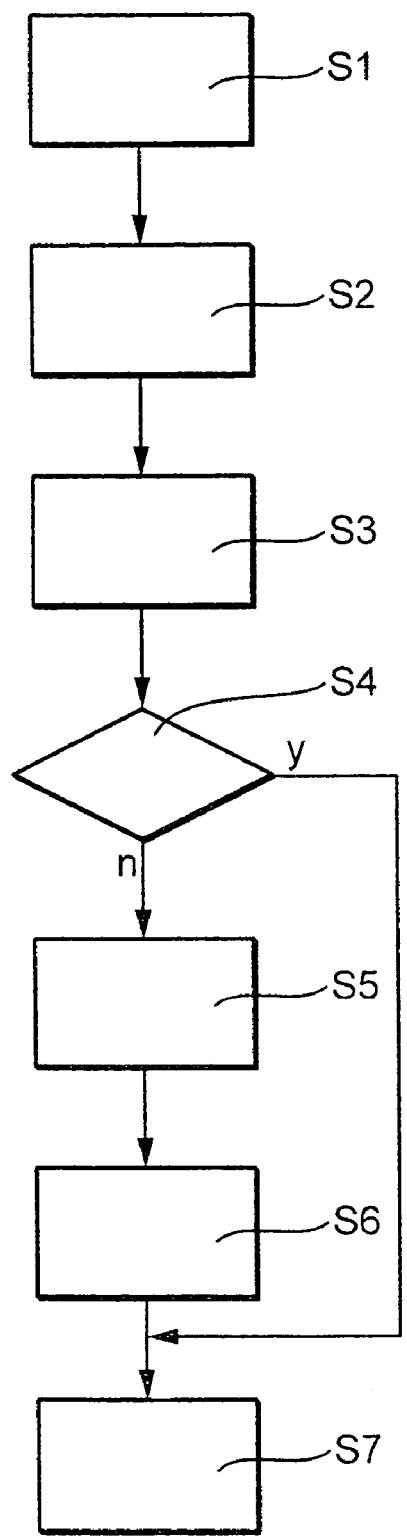
FIG. 2 illustrating the method according to the invention.

In the following, the method for operating a symmetric network address translation NAT 100 according to the invention is described by referring to FIG. 2.

Method step S1 represents the initiation of a new session by one of said user terminals 110-1 or 110-2. In case of such an initiation the private NAT-IP address A and the private NAT-IP port B, both representing the initiating user terminal and its port, the external public NAT-IP address X, the external IP-address C and the external IP port D, both representing the server destination of the initiated session are known/determined; see method step S1.

The only parameter of a co-ordinated NAT entry which is not already known from the in initiation is the public NAT-IP port Y. In method step S2 the NAT port Y is typically arbitrarily selected for the new session. Alternatively to an arbitrary selection the public NAT port might be selected as the next available public port. Said selection of the public NAT-IP port Y is—irrespective of as to how the selection is done—typical for symmetric NAT types.

In principle a new public NAT-IP port Y is selected for each new session. However, this is not a must. In fact, in particular when the port Y is selected arbitrarily there is the possibility that an identical port Y might be selected for different sessions. This is, in difference to the operation of NATs in the prior art no problem here, because a new session is not only identified by said port Y, but by the whole tuple X, Y, C and D. This has the advantage that the available capacity for identifying sessions is significantly increased as will become clear from the following example.

Assuming that the public NAT-IP port is represented by a 16 bit word, that the external address is represented by a 32-bit word and that the external port of the server is represented by a 16-bit word and further assuming that the public NAT-IP address X is constant in each session identifier there is a capacity of $2^{16+32+16}=2^{64}$ bit available for distinguishing different sessions. To the contrary, in the prior art, where different sessions have only been identified by different public NAT-IP ports Y there was only a capacity of $2^{16}$ bit available for distinguishing said sessions. Advantageously, because according to the invention the public NAT-IP port Y is not necessarily changed with each new session it might be used or encoded for other purposes.

With the selection/determination of said private NAT-IP port Y the session identifier in the form of the tuple X, Y, C and D has been completed.

In method step S3 said complete tuple is compared with the tuples presently registered in said first NAT-table. If there is found an identical entry in said NAT-table the method according to the invention goes to method step S7 and uses said already registered tuple/entry for starting the new session. Due to said already existing entry there is no need for a new entry in said first NAT-table and the new session is allowed to run via said NAT due to said already existing entry.

However, in the case that in method step S4 there is no identical tuple X, Y, C and D found in said first NAT-table, the method according to the present invention goes to method step S5 for generating a new/additional entry in said first NAT-table representing the tuple newly generated in previous method steps S1 and S2.

In a subsequent method step S6 a translation/correlation is created between the public NAT-IP-address X as well as the public NAT-IP port Y and the co-ordinated private IP-address A and private IP port B according to the above-mentioned second NAT-table.

After said creation the entry in the NAT-table is ready and complete and thus the new session is allowed to run via said NAT. Consequently, the method then goes to method step S7 using said newly established NAT entry.

The method according to the invention may be established in the form of a computer program. Such a computer program might be stored on a data storage means. The data storage means may be a compact disc or a so-called flash memory etc. The computer program may be transferred or purchased to a customer when being stored on said data storage means. However, the computer program may alternatively be transferred to the customer via an electronic communications network, in particular the internet.

The invention claimed is:

1. A method for operating a symmetric Network Address Translation (NAT) for setting up sessions between a user terminal and a server, comprising the steps of:
   determining an external internet protocol (IP) address and an external IP port representing said server as well as a public NAT-IP address if a new session is initiated by said user terminal or said server;
   selecting a public NAT-IP port for said new session; and
   setting up the new session between said user terminal and said server via said selected public NAT-IP port based on an entry in a first NAT-table representing sessions currently allowed to run via said NAT;
   generating a tuple comprising the public NAT-IP address, the selected public NAT-IP port, the external IP address and the external IP port as a session identifier which individually identifies the new session; and
   the setting up of the new session is based on an entry of said tuple in said first NAT-table; and
   wherein the public NAT-IP address, the selected public NAT-IP port, the external IP address and the external IP port of the tuple are destination components.

2. The method according to claim 1, wherein, after the public port has been selected, the method comprises the following steps:
   checking if the first NAT-table already comprises an entry of said tuple; and
   inputting said tuple into said first NAT-table before the set up of the new session starts if said entry did previously not exist or
   using the already existing entry of said tuple in the first NAT-table as a basis for the set up of the new session.

3. The method according to claim 1, wherein, before determining the external IP address and port, the method comprises the step of: allocating a private NAT-IP address and port representing said particular user terminal.

4. The method according to claim 1, wherein a tuple is deleted in said first NAT-table after a predetermined time interval.

5. The method according to claim 1, wherein the public NAT-IP port is arbitrarily selected for the new session.

6. The method according to claim 1, wherein a next available public NAT-IP port is selected as the public NAT-IP port for the new session.

7. A computer-readable non-transitory medium encoded with a computer program comprising code for a Symmetric Network Address Translation NAT wherein the code is embodied to carry out the method according to claim 1.

8. A data storage means comprising the computer-readable non-transitory medium according to claim 7.

9. A computer-readable non-transitory storage medium comprising a Symmetric Network Address Translation ("NAT") for setting up sessions between a user terminal and a server, comprising:
   means for detecting the initiation of a new session;
   means for determining an external internet protocol (IP) address and an external IP port representing said server as well as for determining a public NAT-IP address;
   means for selecting a public NAT-IP port for said new session; and
   means for setting up the new session between said user terminal and said server via said selected public NAT-IP port based on an entry in a first NAT-table representing sessions currently allowed to run via said NAT;
   means for generating a tuple comprising the public NAT-IP address, the selected public NAT-IP port, the external IP address and the external IP port as a session identifier which individually identifies the new session; and
   wherein the means for setting up of the new session is embodied to carry out the set up of the new session only, if there is an entry of said tuple in the first NAT-table; and
   wherein the public NAT-IP address, the selected public NAT-IP port, the external IP address and the external IP port of the tuple are destination components.

10. The computer-readable storage medium of claim 9, wherein the NAT comprises a second NAT-table for allocating a private NAT-address and port, representing said user terminal to the public NAT-address and port and vise versa.

* * * * *